United States Patent

Webb et al.

[15] 3,665,209
[45] May 23, 1972

[54] FLUID LEVEL CONTROL SYSTEM

[72] Inventors: Robert M. Webb, Cornell; Keith S. Parry, Granada Hills, both of Calif.

[73] Assignee: T. H. Creears Corporation

[22] Filed: Oct. 22, 1969

[21] Appl. No.: 870,519

[52] U.S. Cl. ............................307/118, 324/61, 73/304 C
[51] Int. Cl. ................................................H01h 35/18
[58] Field of Search ..............324/149, 61; 307/118, 112, 307/116, 125, 130, 202, 308, 252.10, 252.51; 340/244; 73/304 C, 304 R

[56] References Cited

UNITED STATES PATENTS

| | | | |
|---|---|---|---|
| 3,573,550 | 4/1971 | Baker, Jr. | 307/252 J |
| 3,487,231 | 12/1969 | Dixon, Jr. | 307/252 J |
| 3,119,266 | 1/1964 | Atkinson | 73/304 |
| 3,312,936 | 4/1967 | Huntzinger | 73/304 X |

OTHER PUBLICATIONS

General Electric Application Note: Touch Switch, D. R. Grafham, August, 1965

Primary Examiner—Herman J. Hohauser
Attorney—Carl R. Brown

[57] ABSTRACT

A fluid level control system employing a plurality of probes for detecting various fluid levels with each probe having a probe circuit that is closed in response to changes in a capacitive coupling between the probe and the fluid, to provide output signals to a control circuit that in response thereto selectively controls the operation of one or more motor-pump units in a manner that at least one of the motor-pump units is selected in random manner for initial operation, with all motor-pump units being energized upon the continued rising level of the fluid as detected by higher level probes. All the motor-pump units continue to operate until the fluid level is lowered to a point below the level of the lowest detecting probe. The probe circuit employs a capacitive coupling fluid detection, or a capacitive coupling with a neutral return probe through the fluid or with a direct electrical connection with common connected neutral return probes.

1 Claims, 6 Drawing Figures

PATENTED MAY 23 1972

INVENTORS
ROBERT M. WEBB
KEITH S. PARRY

BY *Carl R. Brown*

ATTORNEY

FLUID LEVEL CONTROL SYSTEM

BACKGROUND OF THE INVENTION

There are known systems for detecting fluid levels and for initiating the operation of motor-pump units for pumping fluid down to a desired level, which systems employ a plurality of probes projecting into the fluid for determining the appropriate fluid levels and thus coordinating operation of the motor-pump units. These systems may employ probes that project into the fluid container for direct contact with the fluid, or the probes may be inserted in, for example, an enclosed housing having some means for moving a secondary fluid in the housing in direct relationship with the level of the outside fluid to contact enclosed multi-level probes. In many fluid level control systems, as for example in sewer systems, the open probes tend to become covered with a film that restricts electrical contact with the fluid to provide a signal indicating that the fluid level has reached a given probe. Thus systems which rely upon direct electrical current flow from the probe to an adjacent ground, such as a fluid, requires that the current flow be sufficient in magnitude to assure effective probe fluid level detection through such films. However, as for example in sewer systems, such known probe systems have the possibility of creating a spark discharge that could ignite an explosion of sewer gas. To protect the probes and also to reduce the possibility of explosions, some systems enclosed the probes within a flexible container and have a secondary fluid system within the container. These latter systems are expensive, and do not always reflect the actual condition of the fluid level in the fluid container, in which it is desired to maintain a given fluid level.

Thus it is advantageous to have a fluid control system with a probe circuit that is capable of use with a bare probe projecting into a fluid system, such as a sewer system, which probes and probe circuits detect the fluid levels and yet draws such a minute current flow that there is no possibility of explosion, and that provides an extremely low current return system to provide a closed circuit through the probe circuit and which probes are not effected by thin films of impurities that may coat the probes in the fluid container environment.

SUMMARY OF THE INVENTION

In an embodiment of this invention, an electronic control system employs a plurality of probes that are, in the operating position, placed at staggered levels in a fluid container system. Each of the probes have a probe circuit that detects when the fluid level contacts the probes. These probe circuits employ a capacitive coupling between the probe and the fluid mass in a capacitive bridge circuit, which capacitive coupling is varied in capacitance upon the contact of the fluid with the probe. This variance in capacitance of the capacitive coupling unbalances the capacitive bridge circuit, which unbalanced condition is detected by the probe circuit and initiates closing circuit in a control unit.

The control unit employs a plurality of relay type devices that are energized in response to the detection by the probe and probe circuits of various fluid levels in the fluid container. When fluid contacts the lowest detecting probe, a first relay is energized that also closes contacts for energizing others of the relays in the control unit in response to others of the probes contacting the fluid. The closing of the first relay also energizes an alternator device that alternately opens and closes contacts to motor-pump starter units. A delay circuit having a given time delay de-energizes the alternator device after a given period of time following the energizing of the first relay. The alternating device functions to set up in random fashion an energizing circuit to ones of the motor-pump units. Upon the fluid level rising to the level of a second probe, the probe circuit of the second probe closes a second relay circuit that closes a power circuit to a given one of the motor-pump units as determined by the last position of the alternating device contacts. This starts the operation of a motor-pump unit. Should this motor-pump unit have insufficient capacity to lower the level of the fluid and the fluid continues to rise until it contacts a third probe detector, then the probe circuit of the third probe detector unit initiates the closing of a third relay that closes a circuit to another motor-pump unit through the alternating device contacts. Should the operation of both of the motor-pump units not be sufficient to lower the level of the fluid, then the fluid level rises to a fourth probe detector that energizes a fourth relay circuit initiating a warning signal that the motor-pump units do not have sufficient capacity to handle the fluid flow into the fluid container system.

Should the operation of the two motor-pumps be sufficient to lower the fluid level, then both pumps continue to operate until the fluid is returned to a level below the first probe. Both the second and third relay circuits have self holding circuits that are controlled by a contact of the first relay circuit. Thus the closed motor-pump energizing circuits through the second and third relay circuits continue operation of the motor-pumps until the first relay circuit is de-energized.

Thus in the system, motor-pump units are operated on a random selective basis assuring reasonable use of all motor-pump units where the fluid level is usually only sufficient to initiate operation of one motor-pump unit. Should all motor-pump units be required to handle a given increase in fluid flow, then all motor-pump units operate until the fluid level is returned to a level below the first or lowest positioned detecting probe.

In one embodiment, the detecting probes of each of the probe circuits utilize a conductive probe of any suitable material that is projected into the fluid container. The capacitive coupling between the probe and the fluid initiates the detecting circuit. However the capacitive coupling causes only a slight and hardly detectable current flow through a capacitive bridge circuit in the probe detector, which is not sufficient to initiate any type of spark discharge that could cause an explosion in a gaseous environment. In a second embodiment, a neutral probe is connected to the other side of the power input to the probe circuit of each of the probe circuits, which neutral probes projects into the fluid environment at a level to contact the fluid prior to or at the same time that the fluid rises to a sufficient level to contact the detecting probes. This neutral probe circuit assures a closed circuit return through the fluid medium to the neutral side of the control power circuit to each of the probe circuits. This provides protection against spark discharge by providing a return to neutral current path for current flow through the probe detecting system, even though the system still operates through a capacitive coupling, capacitor bridge circuit that only experiences a slight current flow, as results from the change in the capacitive coupling between the probe and the detected fluid. In still another embodiment, a direct electrical connection is made between the detecting probe and the neutral probe circuit to provide a direct electrical return circuit to the neutral point of the input control voltage to each of the probe circuits. This neutral probe return circuit is placed in a sealed environment with each of the detecting probes. In this latter embodiment, there is no direct contact between the conductive probe and the fluid environment, rather electrical connection is made by other known means, such as by a known diaphragm operated switch.

Thus the control system of this invention employs a unique probe control circuit that operates in conjunction with a control unit that provides random electronic control of the operation of a plurality of motor-pump units and that assures operation of all motor-pump units when fluid flow requires such operation to maintain a given fluid level control.

It is therefore an object of this invention to provide a new and improved fluid level control system.

Other objects and many advantages of this invention will become more apparent upon a reading of the following detailed description and an examination of the drawings wherein like reference numerals designate like parts throughout and in which.

Figure 1:
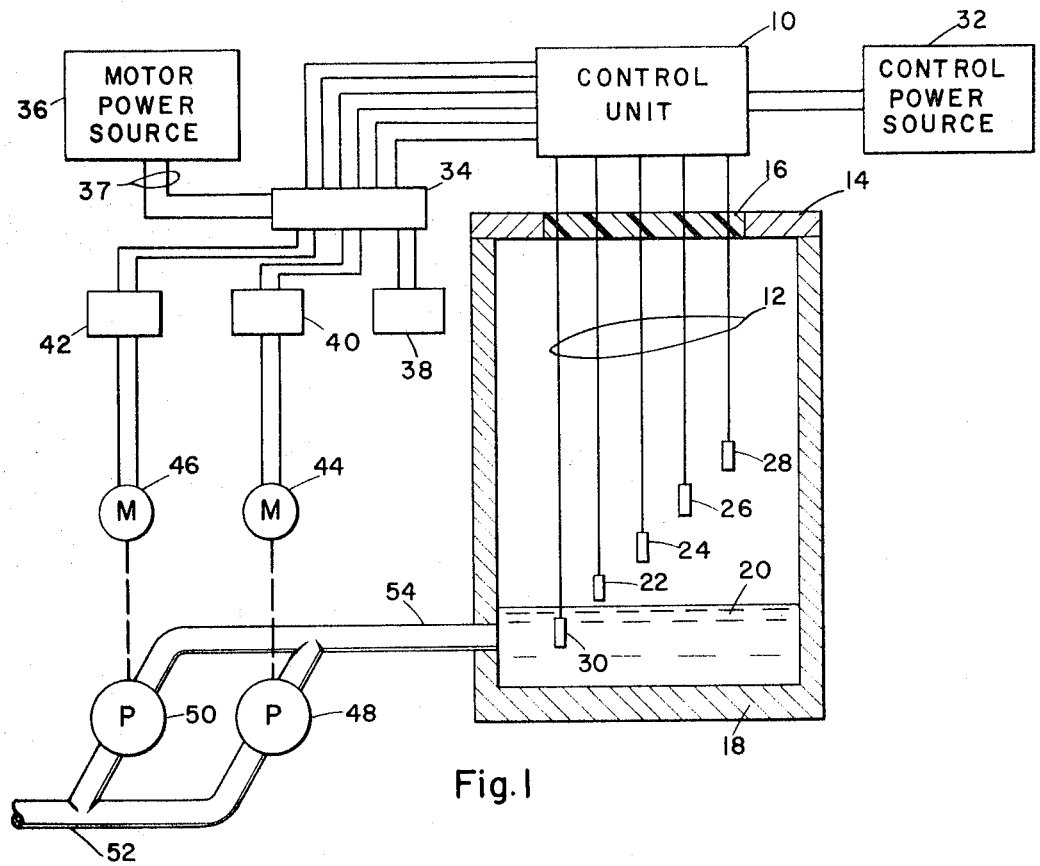
FIG. 1 is a partially diagrammatic vertical section through the liquid level responsive control system.

Referring now to FIG. 1, the liquid level control system of this invention may be used to control the liquid level in any suitable container or stream, such as in sewers, tanks, or other places where liquid level control is desired. In the illustration of FIG. 1, a sewer system for example, has a base 18 with a liquid 20 therein and an upper surface 14. A plurality of probes 22, 24, 26, 28 and 30 provide electrical signals through insulation covered conductor lines 12 to a control unit 10. Insert 16 provides a support for the probe lines. A control power source 32 supplies power to the control unit 10. The control unit 10 provides output control signals in a manner that will be described in more detail hereinafter to a terminal strip 34 that controls the delivery of motor power from a suitable electrical motor power source 36 to motor starter devices 40 and 42 that controls the operation of motors 44 and 46. Motors 44 and 46 operate pumps 48 and 50, that in selective operation pumps liquid from line 54 to a discharge line 52. A high water alarm 38 is energized in a manner that will be described in more detail hereinafter.

Figure 2:
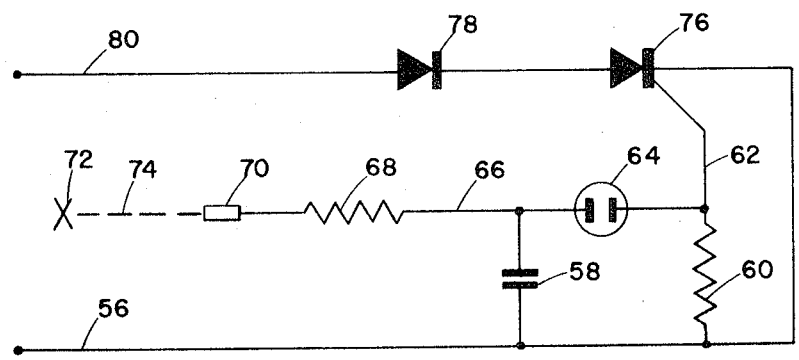
FIG. 2 is a schematic diagram of a probe circuit employed in this invention.

As previously mentioned, it is advantageous in pumping many liquids, and particularly liquids from sewer systems, to have a water level detecting probe circuit that is explosion proof. This normally requires that the detecting probe be sensitive or be in a sensitive circuit, and yet have a current flow in the sensing or probe circuit of very low magnitude to avoid sparks and other electrical discharges that could cause explosions. In an embodiment of this invention, a probe circuit for each of probes 22, 24, 26 and 28 is employed for sensing when the water rises to individual ones of the probes (see FIG. 2). These probe circuits are employed in the overall control unit of FIG. 3.

In operation of one of the probe circuits, an alternating voltage of, for example 115 volts AC, is fed through line 56 to an SCR device 76. When the SCR device 76 is turned on, the alternating current voltage flows through the SCR device 76 and through unidirectional device 78 and line 80 to the control circuit of the control unit. Diode 78 prevents reverse voltage induced current from the load connected to line 80, from damaging the SCR device 76. Accordingly, a pulsating DC voltage is supplied to line 80 when the SCR device 76 is turned on. The probe 70 corresponds to any of probes 22, 24, 26 and 28 that are positioned, as for example in a sewer system, to be contacted or not contacted by the fluid 20, depending upon the level of the fluid. Mark 72 represents a mass adjacent the probe 70 in the sewer environment, which mass corresponds to the fluid. Dash line 74 represents a capacitive coupling between the mass 72 and probe 70. Accordingly, when the fluid level is below probe 70, dash line 74 represents a large capacitive coupling between mass 72 and probe 70. However, when the fluid level contacts probe 70 then the mass or fluid is immediately adjacent probe 70, which considerably reduces the capacitance of the capacitive coupling. Thus the capacitance or capacitive coupling of the dash line 74 is large when the fluid level is below probe 70 and is considerably reduced when the fluid level is in contact with probe 70.

The capacitive coupling 74 and capacitor 58 form a voltage divider from the AC line 56 to the fluid and ground. The voltage across capacitor 58 is thus determined by the ratio of the capacitance between capacitor 58 and the capacitive coupling 74. When the capacitive coupling 74 is reduced by fluid contact with probe 70, then a higher voltage is developed across capacitor 58, which turns on the neon device 64. Capacitor 58 is then discharged through the neon device 64 to the gate of SCR 76 through line 62 triggering on the SCR device 76. The SCR device 76 then remains energized until the circuit recovers by virtue of the fluid being removed from the surroundings of probe 70, which allows the input AC to then turn off the SCR device 76. Resistor 60 functions to remove capacitance across the leads to the SCR device 76. Resistor 68 has a very large resistance in the order of 1 megohm which reduces the current flow through probe 70 to an extremely low magnitude, the normal operating current flow through line 66 being so low as to be difficult to measure. Thus the probe circuit 70 carries such a small magnitude of current as to virtually eliminate the possibility of spark discharges from the probe circuit to surrounding ground conductors.

Figure 3:
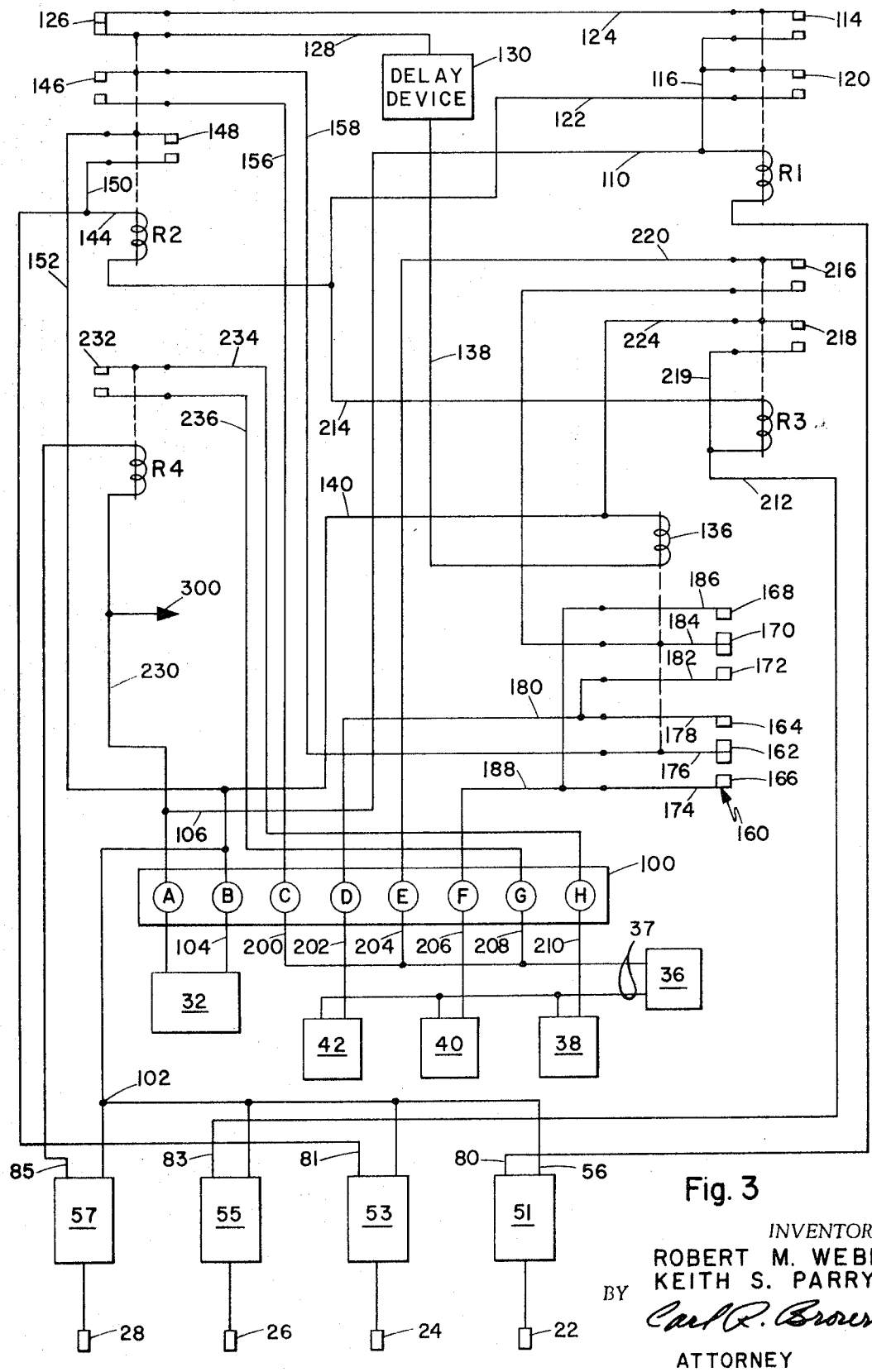
FIG. 3 is a schematic diagram of the electronic control system for controlling the operation of pumps in an exemplary embodiment of this invention.

With reference to FIG. 3, the entire control unit employs individual probe circuits 51, 53, 55 and 57 for the corresponding probes 22, 24, 26 and 28. Each of these probes contains the circuitry shown in FIG. 2 and operates to control the operation of the motors and pumps as follows. In initial condition, each of the probe circuits 51, 53, 55 and 57 is de-energized and thus there is no output pulsating DC in output lines 80, 81, 83, and 85. When the fluid rises to a sufficient level to contact probe 22, then probe controller 51 fires through its SCR device 76, in the manner previously described, to provide output pulsating DC through line 80 to the input line of the relay device R1 and through line circuit 110 to line 106 that is connected to one side of the control power source 32. The input AC voltage is supplied from power source 32 through line 104 terminal strip contact B and through line junction 102 to the input line 56 of the probe circuit 51. Accordingly, the circuit through relay R1 is energized and relay R1 closes its contacts 114 and 120. Closed contact 114 closes a circuit through input power control line 106, line 110, line 116, line 124, through normally closed contact 126, line 128, through time delay device 130, through line 138 to coil 136 of an alternating relay or device 160, through line 140 and return line 104 to the power source 32. This circuit energizes alternating relay 160 that moves at a given periodic time rate for moving the alternating contacts 168, 170, 172, 164, 162, and 166 to alternately close the contacts, as for example contacts 162 and 170, with one or the other of its adjacent contacts. The alternating relay continues to operate until the contacts 131 of the time delay device 130 opens. The time delay device 130 may comprise any known time delay mechanism that in operation opens a self holding contacts circuit, which contacts reclose after a given time period. For example, relay 130 may comprise a known heater and bimetal element to control the time delay. The heater remains energized through contacts 126 of relay R2, until relay R2 is energized through the probe circuit 53. This opens contacts 126, which opens the delay device 130 circuit and the heater and bimetallic members cool, closing the contacts in time delay for recurrent operation when contacts 126 are again closed. This time delay device provides about a 3 to 5 second delay time, which allows the alternating coil to operate for this period of time in moving the alternating contacts. This provides selectively alternating control of the two pump-motors in the manner that will be described in more detail hereinafter. The closing of relay contact 120, provides through line 122 a return line through line 118, line 116, and line 110 to the power input line 106 to make an available closing circuit for each of relays R2 and R3. Thus relay R1 functions to arm the other probe circuits 53 and 55.

When the fluid 20 rises to a sufficient level that it contacts probe 24, then probe circuit 53 energizes, providing pulsating DC current through line 81, line 144, relay R2 and line 122, energizing relay R2. Relay R2 then closes contacts 146 and 148 and opens contact 126. The opening of contact 126 opens the circuit to the time delay device 130, which opens the circuit to the alternating coil 136 leaving the alternating contacts in their last position. When the heater in device 130, cools, after opening normally closed contacts 126, then the bimetallic contacts close. This arms the AC circuit to the alternating relay, for operation when contacts 126 is again closed. Closed contact 148 closes a circuit from line 104, line 152, line 150, line 144, relay R2 to line 122 providing a self-holding energizing circuit for the relay R2. Relay contact 146 closes a circuit from terminal C of the terminal strip 100 through line 156, closed contact 146, line 158, line 176, and through for example, closed contacts 162 and 166 through line 174, line 188, to terminal contact F of the terminal strip 100. This closes a power circuit from motor power source 36 and lines 37 through line 200 closed contacts C and F and line 206 to the motor starter 40 which energizes motor 44 and operates pump 48, shown in FIG. 1. Should the alternating contacts be in the other position in which contacts 162 and 164 are closed, then the circuit would be closed through line 178, 180 to terminal contact D, that through line 202 would energize the motor starter 42 and thus operate motor 46 to drive pump 50. Thus it may be seen that the alternator device 136 and alternator contacts 160 allow selective operation of either of motors 44 and 46 upon the water level moving to the level of probe 24, either of motors 44 and 46 upon the water level moving to the level of probe 24, so that each of the motors is used approximately 50 percent of the time of operation. This increases the useful life of the two motors, and pumps. Assuming that the water level is continuing to rise, notwithstanding the operation of pumps 48 or 50, then when the water level reaches probe 26, the probe controller 55 is energized providing an output pulsating DC through line 83 through line 212, relay R3, line 214, to return line 122. This energizes relay R3 and closes contacts 216 and 218. The closing of contact 216 closes a circuit through the E terminal of terminal strip 100 through line 220, closed contacts 216, line 184 to contact 170 that is closed to either contact 168 or 172 depending upon the position of the alternating contacts. Accordingly, line 184 is connected either through line 186 to terminal F or through lines 182 and 180 to terminal D, which corresponds to the opposite connection of the other terminal contacts energizing the other motor through the terminal strip 100 and the related motor connections. Accordingly, upon reaching probe 26, the fluid causes the other motor to be energized and thus both motors and both pumps are now in operation.

Should the water continue to rise, the combination of pumps 48 and 50 is not sufficient to handle the influx of fluid, then the fluid will contact probe 28 and energize the probe controller 57, causing an output current through line 85 to relay R4 and through line 230 to line 106, and providing a closed circuit that energizes relay R4 and closes switch contact 232. Switch contact 232 closes lines 234 and 236 to terminal connectors H and G of the terminal strip 100, that through line 208 and 210 energize the high water alarm 38. The high water alarm alerts maintenance personnel that there is a condition existing which the pump system cannot handle.

Assuming the pumps 48 and 50 have sufficient capacity to bring the water level down, the water level decreases to below probe 28 which allows the probe controller 57 to recover shutting off the SCR device and terminating pulsating DC current through line 85, which de-energizes relay R4 and shuts off the high water alarm. When the water decreases to below probe 26, then the probe controller 55 is de-energized and pulsating DC current is shut off from line 83. However, since relay contact 218 is closed, a holding circuit exists through line 140, line 224, closed contact 218, line 219, line 212, relay R3, line 214, and line 122 that holds relay R3 energized. Accordingly, the particular motor of motors 44 and 46 that was energized by relay circuit R3 is held in operation. When the fluid level drops below probe 24, then probe controller 53 is de-energized shutting off current through line 81 to relay R2. However, the self holding circuit through contact 148 holds relay R2 energized and thus maintains power to the particular motor controlled by relay R2. When the fluid level is decreased to below probe 22, then probe controller 51 is de-energized which shuts off the energizing current through line 80 to relay R1, which de-energizes and opens its contacts 114 and 120. Upon opening contact 120, the holding circuits for relays R2 and R3 are opened and these relays de-energized opening their contacts with relay R2 closing contact 126. This de-energizes both motors 44 and 46 and thus shuts down pumps 48 and 50.

Thus it may be seen that the control circuit alternately energizes one or other of the motors 44 and 46 except when the fluid conditions are such that requires the operation of both motors and both pumps, and in the latter condition, both motors and both pumps are held energized until the holding circuit through relay R1 is de-energized.

The particular advantage of the probe system and probe circuit thus far described, is that the probes merely project into the fluid. The parameters of the circuit are such that even though a relatively thin film of grease may coat the probes, the probes will still have sufficient contact with a body of fluid that has some conducting capacity, to activate the control circuit. Thus the probe system does not depend upon an electrical discharge through the fluid medium, and can be used in sewers and the like where the probes have a tendency to be coated with thin films.

Figure 4:
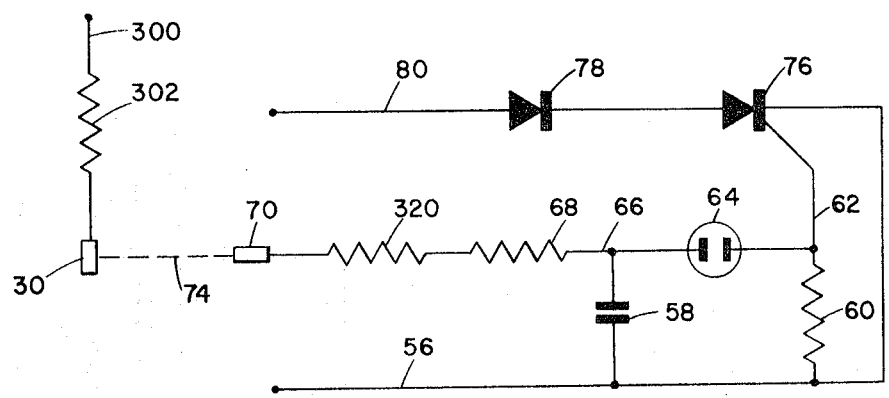
FIG. 4 is a schematic diagram of a modified embodiment of the probe circuit that is used with a return probe circuit.

In some uses of fluid level control systems, it is either desired or a requirement that there be some type of return circuit for the probe circuit. In these systems, applicant's fluid level control system employs a fifth probe 30 that coordinates with a modified embodiment of the probe controller circuit as illustrated in FIG. 4. This circuit is the same as that previously described relative to FIG. 2 with the addition of a further current limiting resistor 320 between resistor 68 and the probe 70, and the return probe 30 is connected through a resistor 302 and line 300 to the return side of the input control circuit line 106, as indicated in FIG. 3. Thus in this embodiment, the capacitive effect illustrated by the dotted lines 74 is essentially between the probe 30 and probe 70. When this space represented by dotted line 74 is occupied by a fluid having some conductive capability, then the capacitive effect of the probe circuit 70 is decreased relative to the capacitance of capacitor 58 and the SCR device 76 is energized in the previously described manner. The probe 30, of course, cooperates with all of the previously described probes and probe circuits and the liquid level control system of FIG. 3 operates in the manner previously described.

Figure 5:
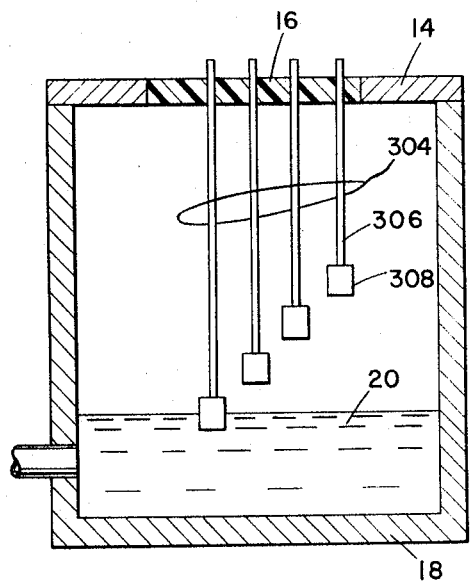
FIG. 5 is a partially diagrammatic view of a modified embodiment of this invention.
Figure 6:
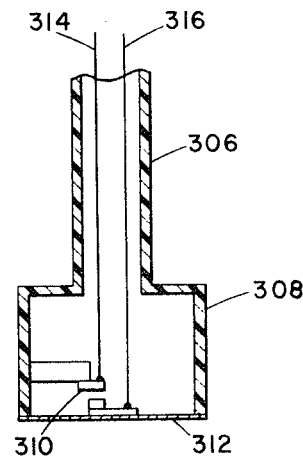
FIG. 6 is a cross sectional view of a probe employed in the embodiment of FIG. 5.

In another embodiment, as illustrated in FIGS. 5 and 6, it is often advantageous where controlling levels of non-conducting fluids or where contamination of the fluids is a major problem, that a neutral or return conductor probe capacitive circuit as previously described, may be replaced by diaphragm operated switching circuits. In such a switching circuit, a plastic tube 306 would carry control wires 314 and 316 to a probe head 308 having a diaphragm 312, that when contacted by water will close a circuit through enclosed contact 310. In using this switch in place of probes 30 and 70 in FIG. 4, there is a direct electrical contact through the probe circuit from line 66 through resistor 68, resistor 320, resistor 302, and line 300 to input line 106, referring to FIG. 3. This of course closes a circuit reducing the capacity effect of capacitor 58 and thus provides a sufficient voltage to energize neon tube 64 and through the gate signal line 62 to energize the SCR device 76. Thus in the embodiment of FIGS. 5 and 6, the probes are actually electrical switch contacts, whereas in FIG. 4, a return probe is employed and in FIG. 2, no neutral return probe is required.

Having described our invention, we now claim:

1. The method of controlling a liquid level with a probe control system comprising the steps of,
   placing a conductor probe in proximity to a desired liquid level,
   passing a power potential in response to a gating signal, which power potential controls devices for controlling the liquid level,
   sensing changes in the capacitive coupling of the liquid at the probe by a capacitive voltage divider circuit and supplying a gating signal to a gate device opening the gate device and passing power potential therethrough,
   said gate device being characterized by having an input potential line and a gating signal line and an output line with a capacitive voltage divider circuit connected across the input potential line and the gating signal line, discharging a stored charge in a capacitor connected across the input potential line and the gating signal line in response to sensing changes in the capacitive coupling, and preventing reverse voltage induced current from damaging the gate device.

* * * * *